United States Patent
Takahashi (10) Patent No.: US 8,708,010 B2
(45) Date of Patent: Apr. 29, 2014

(54) PNEUMATIC TIRE

(75) Inventor: Toshihiko Takahashi, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 13/301,283

(22) Filed: Nov. 21, 2011

(65) Prior Publication Data

US 2012/0145293 A1    Jun. 14, 2012

(30) Foreign Application Priority Data

Dec. 14, 2010 (JP) ................................ 2010-278174

(51) Int. Cl.
*B60C 11/117* (2006.01)

(52) U.S. Cl.
USPC .................................................. 152/209.17

(58) Field of Classification Search
CPC .............. B60C 11/0311; B60C 11/032; B60C 2011/0386; B60C 11/0306; B60C 2011/0381
USPC ........... 152/209.17, 900, 209.15, 209.18, 901
IPC ...................................................... B60C 11/117
See application file for complete search history.

(56) References Cited

U.S. PATENT DOCUMENTS

| | | | |
|---|---|---|---|
| 2003/0089439 A1 * | 5/2003 | Thiebaud | ................. 152/209.17 |
| 2010/0170601 A1 | 7/2010 | Ohashi | |
| 2010/0263775 A1 | 10/2010 | Watanabe | |
| 2012/0067479 A1 | 3/2012 | Waki et al. | |

FOREIGN PATENT DOCUMENTS

| | | | | |
|---|---|---|---|---|
| JP | 62-59107 A | | 3/1987 | |
| JP | 2007-090944 A | | 4/2007 | |
| JP | 2007090944 | * | 4/2007 | ............. B60C 11/04 |
| JP | 2007153239 | * | 6/2007 | ............. B60C 11/00 |
| WO | 2010/137345 A1 | | 12/2010 | |

OTHER PUBLICATIONS

Machine Translation: JP2007-153239A; Takahashi, Fumio, (No date).*
Machine Translation: JP2007-090944A; Takashashi, Fumio, (No date).*
European Search Report dated Apr. 17, 2012, issued in corresponding European Patent Application No. 11 19 3607.6, (5 pages).

* cited by examiner

*Primary Examiner* — Richard Crispino
*Assistant Examiner* — Kendra Shin
(74) *Attorney, Agent, or Firm* — Westerman, Hattori, Daniels & Adrian, LLP (57) ABSTRACT

A pneumatic tire comprises, on a tread surface, a circumferential groove which extends in a tire circumferential direction, a land portion which is zoned by the circumferential groove, and a plurality of lag grooves in which one end is open to a side of the circumferential groove and another end is terminated within the land portion, wherein the land portion has a rib-like portion which is successive in a tire circumferential direction and a wing portion which is zoned by the lag grooves, and wherein a plurality of small holes are formed on a surface of the land portion along a line connecting trailing end portions of the lag grooves adjacent to each other.

5 Claims, 6 Drawing Sheets

PNEUMATIC TIRE

BACKGROUND OF THE INVENTION

1. Field of the Invention

The present invention relates to a pneumatic tire provided, on a tread surface, with a circumferential groove which extends in a tire circumferential direction, a land portion which is zoned by the circumferential groove, and a plurality of lug grooves in which one end is open to a side of the circumferential groove and another end is terminated within the land portion.

2. Description of the Related Art

As a tread pattern of the pneumatic tire, there has been frequently employed a tread pattern provided with a circumferential groove which extends in a tire circumferential direction, a land portion which is zoned by the circumferential groove, and a plurality of lug grooves in which one end is open to a side of the circumferential groove and another end is terminated within the land portion, and structured such that the land portion has a rib-like portion which is successive in the tire circumferential direction and a wing portion which is zoned by the lug grooves.

In Japanese Unexamined Patent Publication No. 2007-90944, there is disclosed a pneumatic tire in which the land portion has the rib-like portion and the wing portion as mentioned above, characterized in that a lot of small holes are provided in a tire ground surface side of the wing portion.

However, in the pneumatic tire of Japanese Unexamined Patent Publication No. 2007-90944, it has been known that a rigidity of the wing portion is lowered by provision of the small holes in the tire ground surface side of the wing portion, and a steering stability is deteriorated due to a weakness in a lateral force. Further, if the rigidity of the wing portion is lowered, a rigidity difference between the rib-like portion and the wing portion becomes larger, and it has been known that such irregular wear that the rib-like portion preferentially wears in comparison with the wing portion comes into question. Further, since the wing portion tends to be deformed back and forth in comparison with the rib-like portion at a time when the force in the tire circumferential direction is applied to the land portion, a bending moment is generated on a trailing end portion of the lug groove as a base point, and a strain becomes maximum at the trailing end portion of the lug groove. It has been known that the strain causes the irregular wear.

SUMMARY OF THE INVENTION

The present invention has been made in view of the above circumstances, and an object of the present invention is to provide a pneumatic tire having improved irregular wear resistance while maintaining a steering stability.

In order to solve the problem mentioned above, in accordance with the present invention, there is provided a pneumatic tire comprising a circumferential groove which extends in a tire circumferential direction, a land portion which is zoned by the circumferential groove, a plurality of lug grooves in which one end is open to a side of the circumferential groove and another end is terminated within the land portion, and the circumferential groove, the land portion and a plurality of lug grooves being provided on a tread surface, wherein the land portion has a rib-like portion which is successive in a tire circumferential direction and a wing portion which is zoned by the lug grooves, and wherein a plurality of small holes are formed on a surface of the land portion along a line connecting trailing end portions of the lug grooves adjacent to each other.

With the pneumatic tire in accordance with this structure, it is possible to reduce a strain caused by a compression and a tension in the trailing end portion of the lug groove, by forming a plurality of small holes along the line connecting the trailing end portions of the adjacent lug grooves, on the surface of the land portion, and it is possible to suppress irregular wear caused by the strain. Further, since the small holes are not formed in the wing portion, the rigidity of the wing portion is not lowered, and the steering stability is not deteriorated. Further, since the rigidity of the wing portion is not lowered, a rigidity difference between the rib-like portion and the wing portion does not become large, and it is possible to suppress the irregular wear caused by the rigidity difference between both portions. As a result, in accordance with the present invention, it is possible to provide a pneumatic tire having improved irregular wear resistance while maintaining the steering stability.

In the pneumatic tire in accordance with the present invention, it is preferable that a plurality of small holes are formed in a strip-shaped area having a width of 5 mm in a side of the rib-like portion and a width of 3 mm in a side of the wing portion, on the basis of the line. It is possible to suppress the irregular wear caused by the rigidity difference while keeping the rigidity difference between the rib-like portion and the wing portion small by forming the small holes near the line connecting the trailing end portions of the adjacent lug grooves, and it is possible to effectively suppress the irregular wear caused by the strain of the trailing end portion.

In the pneumatic tire in accordance with the present invention, it is preferable that a volume of a plurality of small holes is larger in accordance with being closer to the trailing end portion. The strain in the whole of the land portion is uniformized by forming the small holes having a great volume near the trailing end portion of the lug groove in which the strain becomes largest, thereby being advantageous for improving the irregular wear resistance.

In the pneumatic tire in accordance with the present invention, it is preferable that a diameter of the small hole is between 0.5 and 3.0 mm, a depth of the small hole is between 0.1 times and 0.8 times of a depth of the circumferential groove, and a distance between the small holes is between 1.5 times and 5 times of the diameter. It is possible to effectively improve the irregular wear resistance while maintaining the steering stability of the pneumatic tire, by forming a plurality of small holes having such a diameter, depth and distance as mentioned above.

DETAILED DESCRIPTION OF THE PREFERRED EMBODIMENTS

Figure 1:
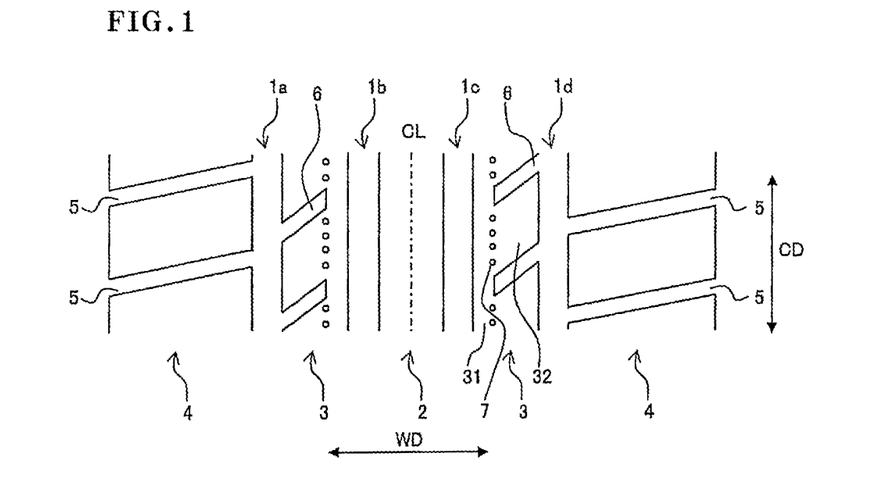
FIG. 1 is a view showing a tread pattern of a pneumatic tire in accordance with the present embodiment.
Figure 2:
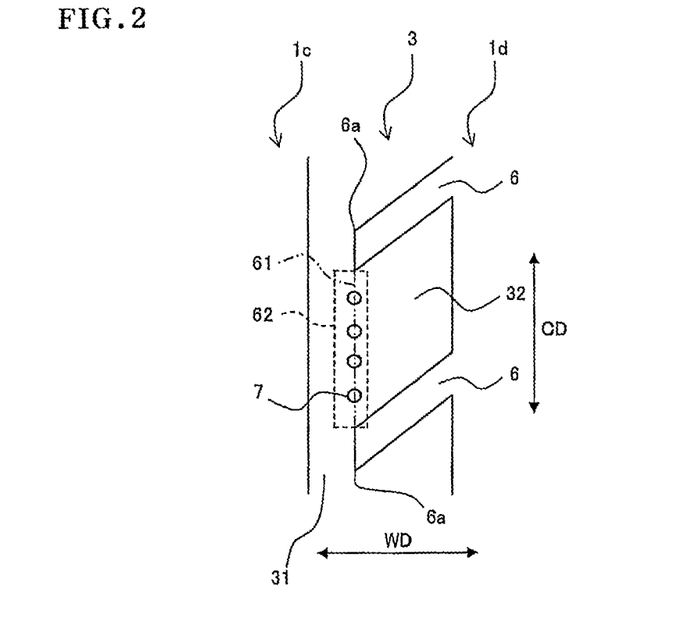
FIG. 2 is a partly enlarged view of the tread pattern in FIG. 1.
Figure 3:
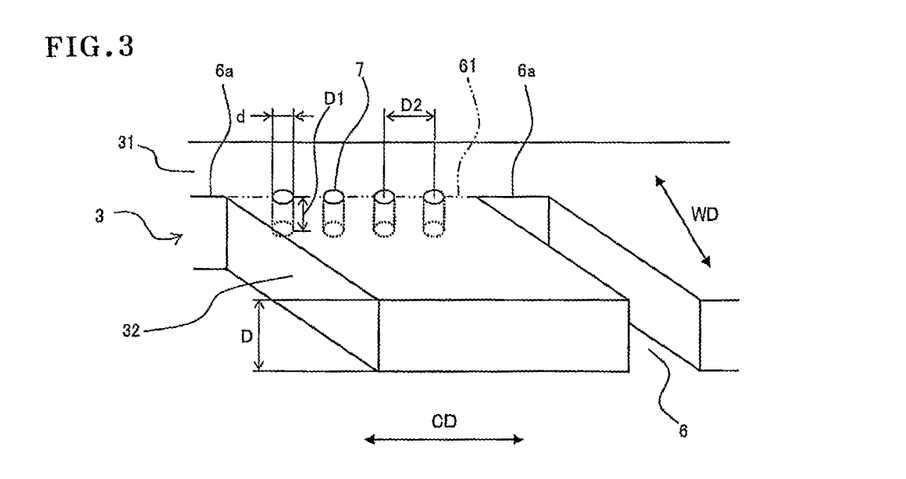
FIG. 3 is a perspective view showing a shape of a land portion.

A description will be given below of an embodiment in accordance with the present invention with reference to the accompanying drawings. FIG. 1 is a view showing a tread pattern of a pneumatic tire in accordance with the present embodiment. FIG. 2 is a partly enlarged view of the tread pattern in FIG. 1. FIG. 3 is a perspective view showing a shape of a land portion. In FIGS. 1 to 3, reference symbol WD denotes a tire width direction, and reference symbol CD denotes a tire circumferential direction. Further, reference symbol CL denotes a tire equator line.

The pneumatic tire in accordance with the present embodiment is provided, on a tread surface, with circumferential grooves 1a to 1d which extend in the tire circumferential direction CD, land portions 2 to 4 which are zoned by the circumferential grooves 1a to 1d, and a plurality of lug grooves 6 in which one end is open to a side of the circumferential grooves 1a and 1d and another end is terminated within the land portion 3.

In the present embodiment, four circumferential grooves 1a to 1d are provided. The number of the circumferential grooves is not limited to four, however, it is preferable that at least three circumferential grooves are provided.

The land portion 2 which is zoned by the circumferential groove 1b and the circumferential groove 1c is positioned approximately in the center in the tire width direction WD. Further, two land portions 3 are positioned respectively in both sides of the land portion 2, and are zoned respectively by the circumferential groove 1a and the circumferential groove 1b, and the circumferential groove 1c and the circumferential groove 1d. Further, two land portions 4 are positioned respectively in outer sides of the land portions 3 in the tire width direction WD, and are zoned respectively by the circumferential grooves 1a and 1d. In this case, the land portions 4 in accordance with the present embodiment are further zoned by a lateral groove 5 which extends to an outer side in the tire width direction WD from each of the circumferential grooves 1a and 1d positioned in the outermost side in the tire width direction WD, among the circumferential grooves 1a to 1d, and are formed as block shapes which are arranged along the tire circumferential direction CD.

The land portion 3 is provided with a plurality of lug grooves 6 in which one end is open to a side of the circumferential grooves 1a and 1d, and another end is terminated within the land portion 3. Accordingly, the land portion 3 has a rib-like portion 31 which is successive in the tire circumferential direction CD, and a wing portion 32 which is zoned by the lug grooves 6. In this case, the lug groove 6 in accordance with the present embodiment is inclined with respect to the tire width direction WD, however, is not necessarily inclined.

A plurality of small holes 7 are formed on a surface of the land portion 3 along a line 61 connecting trailing end portions 6a of the adjacent lug grooves 6. In this case, it is not necessary that a center of the small hole 7 is accurately arranged on the line 61, but it may be shifted right and left of the line 61. Further, a part of the small hole 7 may not be necessarily in contact with the line 61. In this case, it is at least preferable that the small holes 7 are arranged in a line on a line which is in parallel with the line 61.

It is preferable that a plurality of small holes 7 are formed in a strip-shaped area 62 which has a width of 5 mm in a side of the rib-like portion 31 and a width of 3 mm in a side of the wing portion 32, on the basis of the line 61, and it is more preferable that the small holes 7 are formed in a strip-shaped area 62 which has a width of 3 mm in a side of the rib-like portion 31 and a width of 2 mm in a side of the wing portion 32, on the basis of the line 61. The small holes 7 are formed within the strip-shaped area 62 of the land portion 3, and are not formed in the other regions than the strip-shaped area 62.

In the present embodiment, there is shown an example in which four small holes 7 are formed along the line 61, however, the number of the small holes 7 may be less than four, or may be more than four. In this case, at least one small hole 7 is formed in each of the vicinities of the trailing end points 6a of the adjacent lug grooves 6. It is preferable that a distance from the trailing end portion 6a of the lug groove 6 to the closest small hole 7 is between 0.5 and 9 mm.

A shape of the small hole 7 is formed as a cylindrical shape as shown in FIG. 3. In this case, a cross section of the small hole 7 is not limited to a circular shape as shown in the drawing, but may be an oval shape or a rounded polygonal shape or the like.

A diameter d of the small hole 7 is preferably between 0.5 and 3.0 mm, and is more preferably between 1.5 and 3 mm. Further, a depth D1 of the small hole 7 is preferably between 0.1 and 0.8 times of D, assuming that D is a depth of the circumferential grooves 1a to 1d, and is more preferably between 0.3 and 0.8 times. A distance D2 between the small holes 7 is preferably between 1.5 and 5 times of the diameter d of the small hole 7, and more preferably between 2 and 4 times. In this case, the distance D2 is assumed to be a distance between the centers of the adjacent small holes 7.

<Another Embodiment>

Figure 4:
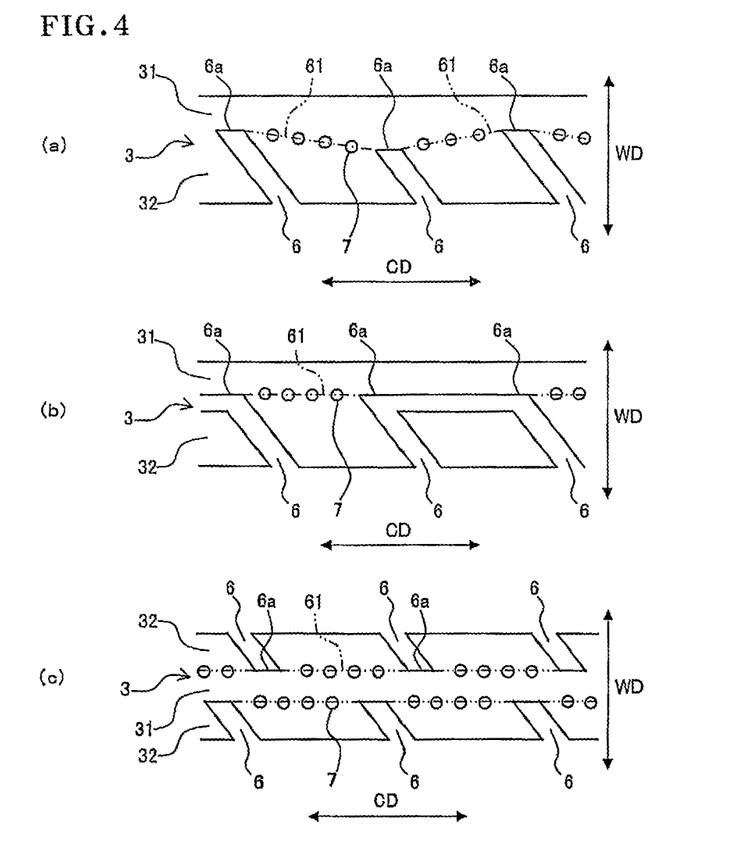
FIGS. 4A to 4C are views showing a shape of a land portion and an arrangement of small holes in accordance with the other embodiment.

The shape of the land portion 3 and the arrangement of the small holes 7 are not limited to the above embodiment. For example, it is not necessary that the shapes of the lug grooves 6 are all identical, but the lug grooves 6 having a plurality of lengths may be formed as shown in FIG. 4A. In this case, the line 61 connecting the trailing end points 6a of the adjacent lug grooves 6 is inclined with respect to the tire circumferential direction CD. Further, as shown in FIG. 4B, in the case where the trailing end points 6a of the adjacent lug grooves 6 are connected by a groove, the small holes 7 may be formed only along the line 61 which is not connected by the groove. Further, the lug grooves 6 may be arranged in both sides in the tire width direction WD of the land portion 3, as shown in FIG. 4C.

Figure 5:
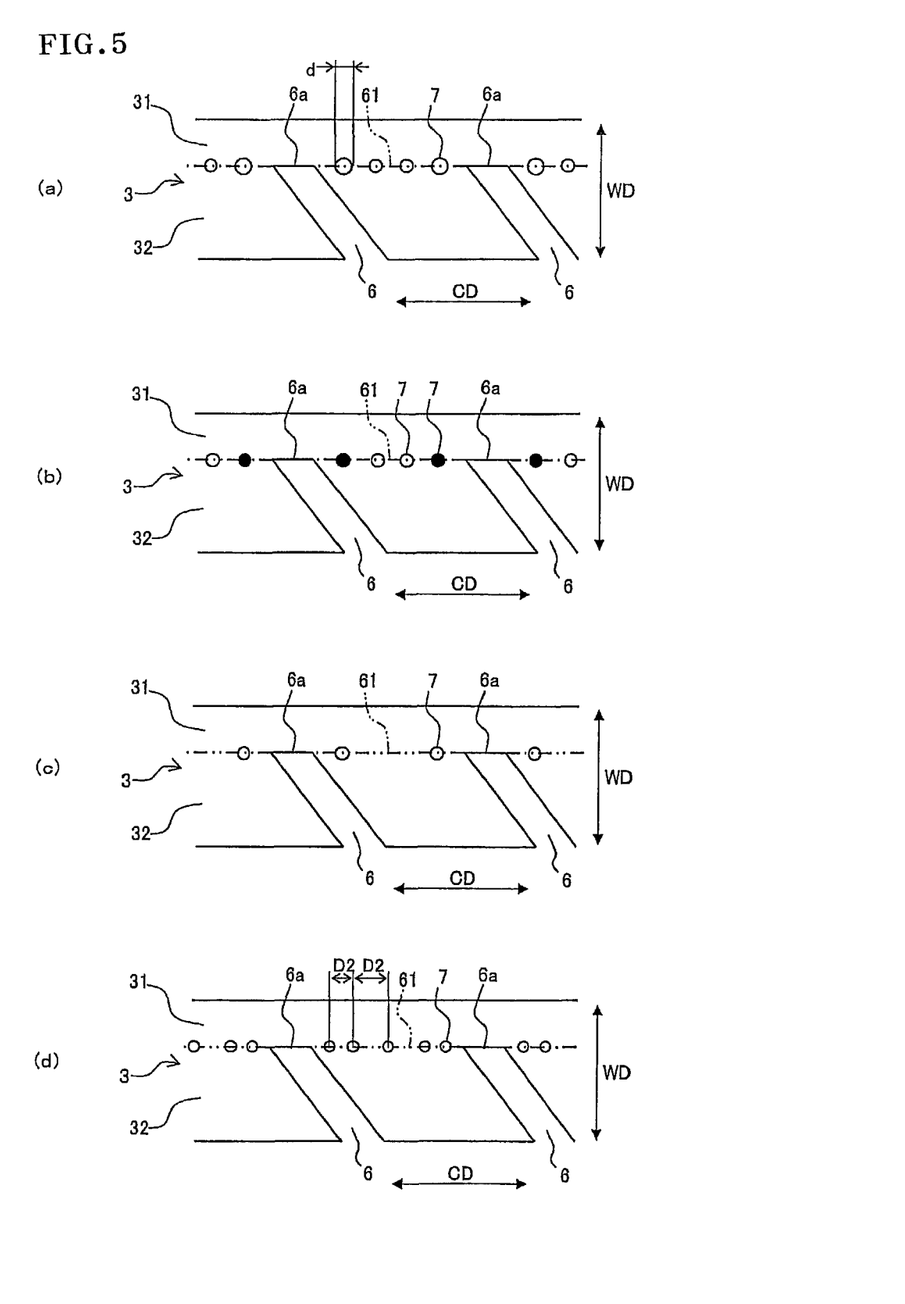
FIGS. 5A to 5D are views showing a shape and an arrangement of small holes in accordance with another embodiment.

Further, it is not necessary that the shapes of a plurality of small holes 7 are all identical. Since a strain becomes largest in the vicinity of the trailing end point 6a of the lug groove 6, it is preferable that a volume of the small holes 7 is larger in accordance with being closer to the trailing end point 6a. Specifically, the volume of the small hole 7 can be regulated by changing the diameter d and the depth D1. FIG. 5A shows an example in which the depth D1 of the small hole 7 is fixed and the diameter d of the small hole 7 is made larger in accordance with being closer to the trailing end point 6a. FIG. 5B shows an example in which the diameter d of the small hole 7 is fixed and the depth D1 of the small hole 7 is made deeper in accordance with being closer to the trailing end point 6a. In this drawing, the depth D1 of the small hole 7 shown by a black circle becomes deeper than the depth D1 of the small hole 7 shown by an outline circle. In this case, the diameter d of the small hole 7 may be made larger in accordance with being closer to the trailing end point 6a and the depth D1 of the small 7 may be made deeper in accordance with being closer to the trailing end point 6a.

Further, a plurality of small holes 7 are formed along the line 61, however, at least two small holes 7 are formed. FIG. 5C shows an example in which one small hole 7 is formed in each of the vicinities of the trailing end points 6a of the adjacent lug grooves 6.

Further, it is not necessary that the distances D2 between the small holes 7 are fixed, but they can be made smaller in accordance with being closer to the trailing end point 6a of the lug groove 6. FIG. 5D shows an example in which the shapes of the small holes 7 are made identical, and the distances D2 between the small holes 7 are made smaller in accordance with being closer to the trailing end point 6a. Accordingly, a density of the formed small hole 7 becomes higher in accordance with being closer to the trailing end point 6a, and it is possible to effectively reduce a strain near the trailing end point 6a of the lug groove 6 in which the strain becomes largest.

EXAMPLE

A description will be given below of an example which specifically shows a structure and an effect of the present invention. In test tires set before each of performance evaluations, a tire size is 225/45R17, a used rim is 17×7.5JJ, and a pneumatic pressure is 220 kPa. Each of the tires in accordance with the following examples was installed to a passenger vehicle of 2500 cc, and a steering stability and irregular wear resistance were evaluated. Each of the performance evaluations of the tire was carried out as follows.
(1) Steering Stability A feeling test was carried out by two drivers on a dry road and a wet road, and each of average values was evaluated by an index number. In this case, the evaluation was carried out by an index number on the assumption that a result of a comparative example 1 is 100, and the larger index number indicates an excellent steering stability.
(2) Irregular Wear Resistance After traveling on a general road for 12000 km, a value obtained by dividing an amount of wear of a most wearing position of the tire by an amount of wear of a least wearing position was determined. The closer numerical value to 1.0 indicates an excellent irregular wear resistance.

Example 1

On a surface of the land portion 3, there was manufactured a pneumatic tire in which a plurality of small holes 7 were formed along the line 61 connecting the trailing end points 6a of the adjacent lug grooves 6. The shape of the land portion 3 and the arrangement of the small holes 7 are set as shown in FIG. 2. In the shape of the land portion 3, the width in the tire width direction WD of the rib-like portion 31 was set to 8 mm, the width in the tire width direction WD of the wing portion 32 was set to 16 mm, and the length of the line 61 was set to 23 mm. The diameter d of the small hole 7 was set to 2 mm, the depth D1 was set to 4 mm, and the distance D2 between the small holes 7 was set to 4.6 mm. Results obtained by carrying out the evaluations mentioned above by using the above pneumatic tire are shown in Table 1.

Example 2

It was structured in the same manner as the example 1 except that the diameter d of the small hole 7 was fixed, and the depth D1 was made deeper in accordance with being closer to the trailing end point 6a of the lug groove 6. In FIG. 5B, the depth D1 of the small hole 7 shown by an outline circle was set to 3 mm, and the depth D1 of the small hole 7 shown by a black circle was set to 5 mm. Results obtained by carrying out the evaluations mentioned above by using the above pneumatic tire are shown in Table 1.

Example 3

It was structured in the same manner as the example 1 except that the arrangement of the small hole 7 was set as shown in FIG. 5C. The diameter d of the small hole 7 was set to 2 mm, the depth D1 was set to 4 mm, and the distance from the trailing end point 6a of the lug groove 6 to the closest small hole 7 was set to 4.6 mm. Results obtained by carrying out the evaluations mentioned above by using the above pneumatic tire are shown in Table 1.

Comparative Example 1

The shape of the land portion 3 was set to the same as the example 1, however, the small hole 7 was not formed on the surface of the land portion 3. Results obtained by carrying out the evaluations mentioned above by using the above pneumatic tire are shown in Table 1.

Comparative Example 2

Figure 6:
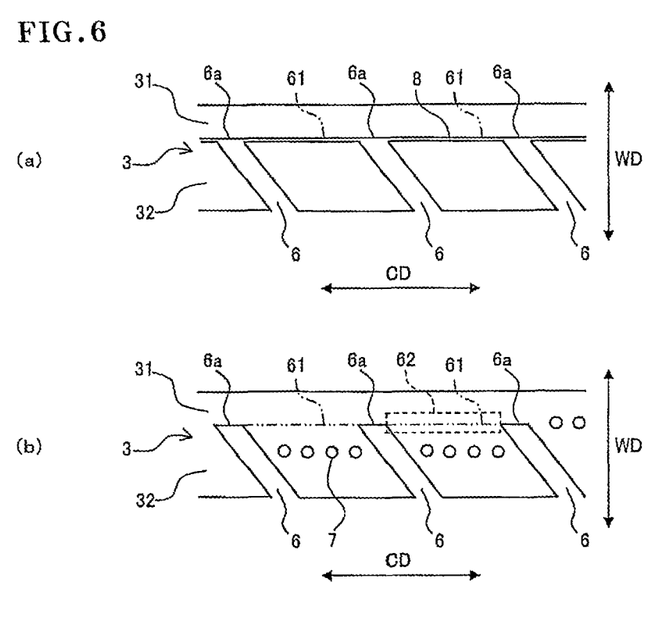
FIGS. 6A and 6B are views showing a land portion in accordance with a comparative example.

In place of forming the small holes 7 on the surface of the land portion 3, a narrow groove 8 was formed along the line 61 connecting the trailing end points 6a of the adjacent lug grooves 6 as shown in FIG. 6A. In the narrow groove 8, a width was set to 2 mm, and a depth was set to 4 mm. The other shapes and the like were set to the same as the example 1. Results obtained by carrying out the evaluations mentioned above by using the above pneumatic tire are shown in Table 1.

Comparative Example 3

The shape of the land portion 3 was formed as the same shape as the example 1, however, the small holes 7 were formed around the center of the wing portion 32 as shown in FIG. 6B. Specifically, the small holes 7 were formed outside the region of the strip-shaped area 62 having the width of 5 mm in the side of the rib-like portion 31 and the width of 3 mm in the side of the wing portion 32, on the basis of the line 61 connecting the trailing points 6a of the adjacent lug grooves 6. The other shapes and the like were set to the same as the example 1. Results obtained by carrying out the evaluations mentioned above by using the above pneumatic tire are shown in Table 1.

TABLE 1

|  | Comparative example 1 | Comparative example 2 | Comparative example 3 | Example 1 | Example 2 | Example 3 |
|---|---|---|---|---|---|---|
| Steering stability | 100 | 95 | 98 | 100 | 100 | 100 |
| Irregular wear resistance | 1.5 | 1.4 | 1.6 | 1.2 | 1.1 | 1.3 |

As shown in Table 1, it is found that the irregular wear resistance is improved in the pneumatic tires in accordance with the examples 1 to 3, in comparison with the pneumatic tire in accordance with the comparative example 1. Further, in the pneumatic tires in accordance with the examples 1 to 3, a deterioration of the steering stability by forming the small holes 7 is not found.

In the comparative example 2 in which the narrow groove 8 is formed in place of the small holes 7, since the land portion 3 is completely separated into the rib-like portion 31 and the wing portion 32, the rigidity of the land portion 3 is lowered, and becomes weak with respect to the force in the tire width direction WD, thereby the steering stability is greatly deteriorated. In the comparative example 3 in which the small holes 7 are formed around the center of the wing portion 32, since the rigidity of the wing portion 32 is lowered, and a rigidity difference from the rigidity of the rib-like portion 31 becomes larger, the irregular wear resistance is deteriorated. Further, in the comparative example 3, a deterioration of the steering stability caused by the reduction of the rigidity of the wing portion 32 is found.

| Description of Reference Numerals | |
|---|---|
| 1a-1d | circumferential groove |
| 2-4 | land portion |
| 5 | lateral groove |
| 6 | lag groove |
| 6a | trailing end portion |
| 7 | small hole |
| 8 | narrow groove |
| 31 | rib-like portion |
| 32 | wing portion |
| 61 | line |
| 62 | strip-shaped area |
| d | diameter of a small hole |
| D1 | depth of a small hole |
| D2 | distance between small holes |
| D | depth of a circumferential groove |
| CL | tire equator line |
| CD | tire circumferential direction |
| WD | tire width direction |

What is claimed is:

1. A pneumatic tire, comprising:
a circumferential groove which extends in a tire circumferential direction;
a land portion which is zoned by the circumferential groove;
a plurality of lug grooves in which one end is open to a side of the circumferential groove and another end is terminated within the land portion; and
the circumferential groove, the land portion and a plurality of lug grooves being provided on a tread surface,
wherein the land portion has a rib-like portion which is successive in a tire circumferential direction and a wing portion which is zoned by the lug grooves, and
wherein a plurality of small holes are formed along a first line, which extends at the terminated end of the lug groove, from a trailing edge thereof to a leading edge thereof, the plurality of small holes also being in a strip-shaped area and said plurality of holes being parallel to the centerline of the tire, and
further, wherein centers of the small holes are positioned along said first line, only in a single row, and not outside the strip-shaped area.

2. The pneumatic tire according to claim 1, wherein the plurality of small holes formed in the strip-shaped area have a width of 5 mm in a side of the rib-like portion and a width of 3 mm in a side of the wing portion.

3. The pneumatic tire according to claim 1, wherein a volume of the plurality of small holes is larger in accordance with being closer to the trailing edge.

4. The pneumatic tire according to claim 1, wherein a diameter of at least one of the small holes is between 0.5 and 3.0 mm, a depth of at least one of the small holes is between 0.1 times and 0.8 times of a depth of the circumferential groove, and a distance between at least one of the small holes is between 1.5 times and 5 times of the diameter.

5. The pneumatic tire according to claim 1, wherein the plurality of holes are formed on a surface of the land portion along said first line between lug grooves adjacent one another.

* * * * *